Patented Mar. 24, 1942

2,277,628

UNITED STATES PATENT OFFICE

2,277,628
COLORING MATTERS OF THE PHTHALOCYANINE SERIES

Eric Flower Bradbrook, Samuel Coffey, and Norman Hulton Haddock, Blackley, Manchester, England, assignors to Imperial Chemical Industries Limited, a corporation of Great Britain No Drawing. Application November 21, 1939, Serial No. 305,562. In Great Britain December 8, 1938

16 Claims. (Cl. 260—314)

Phthalocyanines containing the pyridyl radical

(where . . . signifies that substitution may be at any carbon atom) may be made, for example, by heating pyridylphthalic dinitriles with metal-yielding substances or else with hydroxy compounds or acid amides, or by causing pyridylphthalic acids or anhydrides, or pyridylphthalimides to interact with urea and metal-yielding substances, or else, again, by heating o-dihalogenophenylpyridines or o-halogenocyanophenylpyridines with cuprous cyanide. Thus metal and metal-free pyridyl phthalocyanines are obtainable by applying known processes for the manufacture of phthalocyanines to starting materials in which the intermediates which are to form the benzene nuclei of the phthalocyanines, carry the pyridyl radical (see co-pending application Serial Number 304,410, now Patent No. 2,211,947, issued August 20, 1940). For instance copper tetra-4-pyridylphthalocyanine may be made by heating 4-pyridyl phthalonitrile with cuprous chloride; metal-free tetra-4-pyridyl phthalocyanine is obtainable by heating 4-pyridyl phthalonitrile with triethanolamine or with formamide in the presence of benzophenone.

The said pyridyl phthalocyanines are new compounds. They are green. They dissolve in concentrated sulphuric or hydrochloric acid to give solutions which when poured into water yield finely divided green precipitates which may or may not contain chemically combined metal. The new pyridylphthalocyanines are useful as pigments. Moreover they dissolve in aqueous solutions of sulphamic acid and dry compositions suitable for dissolving in water for preparing dyebaths or for other coloring purposes, may be made by mixing together in the dry state the new phthalocyanines and suitable proportions of sulphamic acid.

We have now found that new coloring matters of the phthalocyanine series can be obtained which are the quaternary ammonium salts (i. e. pyridinium salts) corresponding with the tetrapyridyl phthalocyanines referred to. The substituent group in the phthalocyanine molecule may then be represented thus:

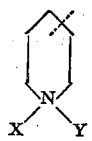

where X stands for alkyl and Y stands for a mono-valent acid radicle.

According to the present invention new phthalocyanine pyridinium salts are made by causing metal or metal-free tetrapyridylphthalocyanines to react with compounds of general formula X—Y.

These compounds are conveniently called quaternising agents, which are for the purposes of this invention, dialkyl sulphates, di-alkyl sulphites, alkyl benzene sulphonates, alkyl p-toluene sulphonates, alkyl chlorides and alkyl bromides, where by alkyl there is to be understood lower alkyl. For example there may be used dimethyl sulphate, methyl p-toluene sulphonate, ethyl p-toluene sulphonate, methyl sulphite, ethyl chloride or methyl bromide.

The reaction is conveniently carried out by heating the pyridylphthalocyanine and the quaternising agent together. For example, the tetrapyridylphthalocyanine may be heated with dimethyl sulphate, or methyl p-toluene sulphonate or ethyl bromide, or the quaternising agent may be generated in the course of the reaction, for example, by causing the tertapyridyl phthalocyanine to interact with an alcohol and an acid or acidyl halide.

Alternatively, according to the invention, pyridinium salt formation and pyridylphthalocyanine formation may be carried out in one operation by heating together the quaternising agent, a pyridyl phthalonitrile and a metal-yielding substance. Thus, a pyridinium salt of copper pyridylphthalocyanine is obtained by heating methyl p-toluene sulphonate, 4-pyridylphthalonitrile and cuprous chloride together.

Some quaternising agents are more suitable for working with according to the invention than others, it may be because of their chemical reactivity or else because, the particular agents yield products possessing to a greater extent those properties which are desirable for the purposes of the invention, as set forth herein below. Thus, it is known that dimethyl sulphate tends to be more reactive than diethyl sulphate, for instance, the former reacting much more smoothly than the latter as an alkylating agent (see Die Methoden der Organischen Chemie, Houben, 3rd edition, 1930, vol. 3, p. 150) and it is found that whilst dimethyl sulphate reacts with pyridyl phthalocyanines with facility to form the quaternary compound, the corresponding reaction in the case of diethyl sulphate is difficult to bring about.

If desired the reactions may be carried out in the presence of a solvent, or a solid or liquid diluent and, if desired, in a pressure vessel. It is convenient to employ sufficient excess of the quaternising agent to act both as reagent and as a solvent or diluent.

Each of the four pyridyl nuclei in a tetra-pyridyl-phthalocyanine is capable of combining with the quaternising agent. In that embodiment of the invention we cause the pyridyl phthalocyanines to react with such an amount, advantageously an excess, of quaternising agent so that all four pyridyl radicals react to form the corresponding pyridinium derivative. Thus products are obtained which are readily soluble in water, whereas incompletely quarternised pyridylphthalocyanines, i. e. those containing less than four pyridinium salt groups are less soluble, or not wholly soluble in water. It will be clear from the aforegoing that the products of this invention are compounds of the phthalocyanine series characterized by containing in the arylene nuclei substituents of the formula

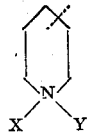

wherein X stands for alkyl, for instance methyl or ethyl, Y stands for a monovalent acid radical, for instance halogen, methylsulfate or p-toluene-sulfonate, and the dotted line indicates attachment between a carbon atom of the above pyridine ring and a carbon atom of the respective arylene rings of the phthalocyanine compound. In the simpler case where quaternization is complete and where the phthalocyanine compound is a metal phthalocyanine, the products of this invention take the form

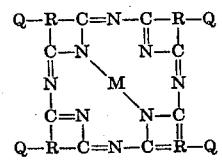

wherein R designates an ortho-arylene radical, Q designates a quaternary pyridinium radical attached to R through a carbon atom in the pyridine ring, while M designates a bivalent cation selected from the group consisting of two hydrogen atoms, a divalent metal, and the bivalent radical of a trivalent metal monohalide.

The new coloring matters dissolve in water to give intense blue green to green solutions. As dyestuffs they show direct affinity for cotton or viscose artificial silk or film, paper, or other cellulosic material and dye these substances in bright blue-green to green shades of excellent fastness properties, particularly as regards washing and light. Whilst the quaternary salts derived from tetra-4-pyridylphthalocyanines are found to possess affinity for cellulosic fibre generally, for example, for both cotton and viscose, the quaternary salts from tetra-3-pyridylphthalocyanines, although unsuitable as direct dyestuffs for cotton, are useful for the purpose of dyeing viscose.

The invention is illustrated but not limited by the following examples, in which the parts are by weight.

*Example 1*

20 parts of copper tetra-4-pyridylphthalocyanine (obtainable in the manner described below) are mixed with 114 parts of dimethyl sulphate and the stirred mixture is heated at 180° C. until a test sample shows that the product when separated as described below is readily soluble in water. The intensely green solution, containing some dark green solid in suspension, is then cooled. 100 parts of carbon tetrachloride are added. The pyridinium methosulphate is thus precipitated. The dark green precipitate is filtered off, washed with hot ethanol and dried.

The new coloring matter, substantially the tetra-(methylpyridinium-methyl-sulfate) corresponding with copper tetra-4-pyridylphthalocyanine, is thus obtained as a dark green purple-lustred granular solid which dissolves readily in water to give an intense green solution and in concentrated sulphuric acid to give a yellowish-brown solution. From an aqueous bath, preferably neutral or slightly alkaline, and if desired with the addition of sodium sulphate, cotton or viscose artificial silk is dyed directly in bright blue green shades. These dyeings are fast to washing.

Copper tetra-4-pyridylphthalocyanine may be made by heating a stirred mixture of 20.5 parts of 4-pyridylphthalonitrile (see co-pending application Serial No. 304,410, Example 1), 5 parts of cuprous chloride and 150 parts of 1-chloronaphthalene at 220–230° C. for 2½ hours. The mixture is cooled and filtered. The green insoluble material is washed with benzene and dried. The copper tetra-4-pyridylphthalocyanine so formed is obtained as a finely divided precipitate by pouring the solution in concentrated sulphuric acid into water.

The 4-pyridyl-phthalonitrile above mentioned may be prepared as follows:

108 parts of 4-aminophthalonitrile (obtained by reducing 4-nitrophthalonitrile) are dissolved in 400 parts of water and 472 parts of aqueous hydrochloric acid, sp. gr. 1.18. The solution is cooled to about 5° C. and 52 parts of sodium nitrite dissolved in 400 parts of water are slowly added.

The aqueous solution of diazo compound thus obtained is run slowly into 800 parts of pyridine which is kept at 30 to 35° C. and is well stirred. Nitrogen is evolved and a pale brown finely divided solid is precipitated. When no more gas is given off the precipitate is filtered off, washed with water and dried. This substance may be purified when necessary by dissolving it in a sufficiency of benzene, and adding petroleum spirit (B. P. 40 to 60° C.) to the solution to reprecipitate it.

The substance so obtained consists of a mixture of pyridyl phthalonitriles and can be represented by the formula $C_5H_4N-C_6H_3(CN)_2$, the linkage with the pyridyl group being in the alpha-, beta- or gamma-position in the pyridine ring.

*Example 2*

20 parts of metal-free tetra-4-pyridylphthalocyanine (obtainable as described below) are here used instead of the 20 parts of copper tetra-4-pyridylphthalocyanine used in Example 1. The mixture is heated at 150° C. The product, copper tetra-4-pyridyl phthalocyanine methyl methosulphate, is similar in appearance to that of Example 1. It dissolves readily in water to give an intense green solution which dyes cotton and viscose artificial silk in yellower shades of green than the product of Example 1. The solution in concentrated sulphuric acid is yellowish-brown.

Metal-free tetra-4-pyridylphthalocyanine may be made by heating at 180° C. for 1½ hours a mixture of 50 parts of 4-pyridylphthalonitrile (see above) and 5 parts of triethanolamine. The purple-lustred product is powdered, extracted with ethanol and dried. It may be obtained as a bright green finely divided precipitate by adding water to its solution in concentrated sulphuric acid. Metal-free tetra-4-pyridylphthalocyanine may also be made by removing the lead from lead tetra-4-pyridylphthalocyanine with acid.

Example 3

10 parts of aluminium tetra-4-pyridylphthalocyanine (obtainable in the manner described below) and 57 parts of dimethyl sulphate are mixed, heated together and otherwise treated as described in Example 1. The product is a bright green powder, readily soluble in water. It dyes cotton or viscose artificial silk bright green shades of very good fastness to washing.

Aluminium tetra-4-pyridylphthalocyanine may be made by heating to 210–220° C. a stirred mixture of 20 parts of 4-pyridylphthalonitrile and 3.4 parts of anhydrous aluminium chloride. At the above temperature an exothermic reaction, with evolution of hydrogen chloride, takes place. The mass becomes solid. It is cooled, crushed, washed with hot ethyl alcohol and dried. The so-obtained green powder has a purple lustre and dissolves in concentrated sulphuric acid to give a yellowish brown solution. When this solution is poured into water a green precipitate is obtained.

Example 4

A mixture of 10 parts of copper tetra-4-pyridyl pythalocyanine, as used in Example 1, and 41 parts of methyl p-toluenesulphonate is heated at 180° C. with stirring until a test sample shows that the product when separated as described below is readily soluble in water. An intense bright green solution is obtained which after cooling is diluted with carbon tetrachloride to precipitate the new coloring matter which is filtered off, washed with carbon tetrachloride and dried.

The new coloring matter is substantially the tetra-methylpyridinium p-toluenesulphonate corresponding with copper tetra-4-pyridylphthalocyanine. It is a purple-lustred granular solid which dissolves readily in water to give a bright green solution and in concentrated sulphuric acid to give a yellowish-brown solution. Cotton and viscose artificial silk are directly dyed preferably from a neutral bath with the addition, if desired, of sodium sulphate, in bright green shades of excellent fastness to washing. In place of copper tetra-4-pyridylphthalocyanine the corresponding metal-free, lead or zinc pyridylphthalocyanine (made by heating 4-pyridylphthalic dinitrile with litharge and zinc respectively) may be employed.

Example 5

A mixture of 102 parts of 4-pyridylphthalonitrile and 100 parts of methyl p-toluenesulphonate is heated at 180° C. for 30 minutes with stirring. 12.5 parts of cuprous chloride are added and the temperature is raised to 210–220° C. The mixture gradually thickens, and becomes intense green in color, and after about one hour it has become almost solid. It is then cooled, crushed, and washed with carbon tetrachloride. It is then dried. The product is similar in appearance and properties to that of Example 4.

Example 6

Working as in Example 4 but using 10 parts of copper tetra-3-pyridylphthalocyanine (obtainable as described below) in place of copper tetra-4-pyridylphthalocyanine, a dark green solid is obtained which is soluble in water to give a bluish-green solution, in ethanol and methanol to give an intense blue green solution, and in concentrated sulphuric acid to give a yellowish-green solution.

Copper tetra-3-pyridylphthalocyanine may be made by heating at 210–220° C. for 1½ hours a mixture of 37.5 parts of 3-pyridylphthalimide (see Example 3 of co-pending application Serial No. 304,410), 55 parts of urea, 9.5 parts of cuprous chloride and 0.1 part of ammonium molybdate. A dark green mass is obtained which is powdered and extracted with hot dilute aqueous sodium hydroxide solution and then with methylated spirits. A dark green powder is obtained which is soluble in hydrochloric acid (sp. gr. 1.18) and in concentrated sulphuric acid to give yellowish-green solutions from which it is reprecipitated in finely divided form by adding water.

Example 7

6.5 parts of copper tetra-3-pyridylphthalocyanine (as used in Example 6) and 65 parts of dimethyl sulphate are heated together with stirring at 170–180° C. until a sample of the product when worked up as described below is completely soluble in water. The reaction mixture after cooling is poured into alcohol. The blue-green precipitate is filtered off, washed with hot ethanol and dried. The product is a dark blue-green powder readily soluble in water to give a green solution.

Example 8

15 parts of copper tetra-4-pyridylphthalocyanine (as used in Example 1), 37.5 parts of methyl p-toluene suphonate and 100 c. c. of nitrobenzene are heated together with stirring at 180–190° C. for 3 hours. After cooling, the product is diluted with an equal volume of benzene and the bluish-green precipitate is filtered off, washed with benzene and dried. The product is similar to that of Example 4. From aqueous solution it dyes cotton bright bluish-green shades of excellent fastness properties.

Example 9

10 parts of copper tetra-4-pyridylphthalocyanine (as used in Example 1) and 100 parts of methyl alcohol (which has previously been saturated with dry hydrochloric acid gas) are heated together in an autoclave at 160° C. for 16 hours. The mixture is removed from the autoclave and a dark green solid in suspension is filtered off. It is triturated with methanol, filtered again, washed with hot methanol and dried. A dark blue green powder is obtained which is soluble in hot water to give a bluish-green solution which dyes cotton or other cellulosic material in bluish-green shades.

In the claims below, the expression "pyridyl-phthalocyanine" shall be understood as referring to a compound of the phthalocyanine series having C-pyridyl radicals attached by bonds running to the carbon atoms of the arylene rings of the phthalocyanine complex.

We claim:

1. Process for the manufacture of new phthalocyanine pyridinium salts which comprises causing pyridylphthalocyanines to interact with quaternising agents.

2. A process as in claim 1, wherein the pyridyl-phthalocyanine is formed in situ in the same reaction mass containing the quaternizing agents.

3. A process for the manufacture of coloring matters of the phthalocyanine series which comprises reacting a tetrapyridyl-phthalocyanine compound with a quaternizing agent.

4. A process for the manufacture of coloring matters of the phthalocyanine series which comprises reacting a tetrapyridyl-metal-phthalocyanine with an agent adapted to convert pyridine into a quaternary pyridinium salt, and recovering the quaternary salt of tetrapyridyl-metal-phthalocyanine thus produced.

5. A process for the manufacture of coloring matters of the phthalocyanine series which comprises reacting metal-free tetrapyridyl-phthalocyanine with an agent adapted to convert pyridine into a quaternary pyridinium salt, and recovering the quaternary salt of tetrapyridyl-metal-free-phthalocyanine thus produced.

6. A process for the manufacture of coloring matters of the phthalocyanine series which comprises reacting tetrapyridyl-copper-phthalocyanine with an agent adapted to convert pyridine into a quaternary pyridinium salt, and recovering the quaternary salt of tetrapyridyl-copper-phthalocyanine thus produced.

7. A process for the manufacture of coloring matters of the phthalocyanine series which comprises reacting aluminium-tetrapyridyl-phthalocyanine with an agent adapted to convert pyridine into a quaternary pyridinium salt, and recovering the quaternary salt of tetrapyridyl-aluminum-phthalocyanine thus produced.

8. A process as in claim 3, wherein the tetrapyridyl-phthalocyanine compound is formed in situ in the same reaction mass containing the quaternizing agent.

9. A process as in claim 6, wherein the tetrapyridyl-copper-phthalocyanine is formed in situ by reacting pyridyl-phthalonitrile with an agent yielding copper, in the presence of the quaternizing agent.

10. Quaternary salts of tetrapyridyl phthalocyanines.

11. A compound of the phthalocyanine series containing substituents of the formula

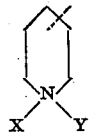

wherein X stands for alkyl, Y stands for a monovalent acid radical, and the dotted line indicates attachment between a carbon atom of the pyridine ring to a carbon atom of the arylene rings of the phthalocyanine compound.

12. A compound of the general formula

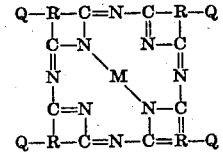

wherein R designates an ortho-arylene radical, Q designates a quaternary pyridinium radical attached to R through a carbon atom in the pyridine ring, while M designates a bivalent cation selected from the group consisting of two hydrogen atoms, a divalent metal, and the bivalent radical of a trivalent metal monohalide.

13. Quaternary salts of metal-free tetrapyridyl-phthalocyanine.

14. Quaternary salts of tetrapyridyl-copper-phthalocyanine.

15. The tetramethyl-tetra (methyl-sulfate) of metal-free tetrapyridyl phthalocyanine.

16. The tetramethyl-tetra (p-toluene-sulfonate) of tetrapyridyl-copper-phthalocyanine.

ERIC FLOWER BRADBROOK.
SAMUEL COFFEY.
NORMAN HULTON HADDOCK.